United States Patent Office 3,558,216
Patented Jan. 26, 1971

3,558,216
POLYETHYLENE DIFFRACTION GRAFTING AND METHOD OF MANUFACTURE THEREOF
Katsuya Kubota, Tokyo, Japan, assignor to Agency of Industrial Science Technology, Tokyo, Japan
Filed Sept. 25, 1968, Ser. No. 762,506
Int. Cl. B29d *11/00;* B32b *23/08, 27/32;* G02b *5/18*
U.S. Cl. 350—162                                           7 Claims

ABSTRACT OF THE DISCLOSURE

A method of manufacturing polyethylene diffraction grating in which a high or medium density polyethylene film held between cellophane films or polyimide films is passed at a constant velocity over and maintained in close contact with heating zone and cooling zone which are maintained at predetermined temperatures.

---

Figure 1:
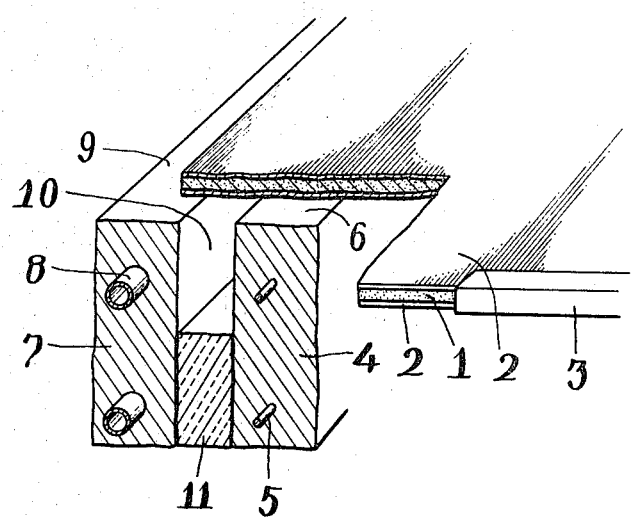

The present invention relates to a polyethylene diffraction grating and a method of manufacture thereof. More particularly, the invention is concerned with a polyethylene diffraction grating produced by varying the arrangement of and orienting crystals in a polyethylene film of high or medium density, which polyethylene diffraction grating causes polarized light to diffract when a beam of polarized light having an electric vector parallel to the direction of constant refractive index line, in other words, normal to the travelling direction of the film when it is manufactured. The polyethylene film markedly exhibits secondary order diffraction image of the light source.

There have heretofore been known diffraction gratings prepared by ruling equidistant parallel lines onto the surface of a metal, glass, plastic or other plate.

There have also been available some reports based on research of the mechanism of deformation of spherulites conducted from the point of view of dynamics wherein a polyethylene film in which crystals of the b-axis of polyethylene oriented in one direction were produced under a steep temperature gradient. No mention is made in these reports, however, of the effect of optical diffraction of such polyethylene film.

It is an object of the present invention to provide a polyethylene diffraction grating which demonstrates the effect of optical diffraction with respect to polarized light having an electrical vector normal to the direction in which the polyethylene film is moved when the polyethylene diffraction grating is prepared, and which has no diffraction effect with respect to polarized light having an electrical vector parallel to the direction in which the polyethylene film is moved when the polyethylene diffraction grating is prepared.

It is another object of the invention to provide a polyethylene diffraction grating having no parallel lines formed thereon.

It is yet another object of the invention to provide a polyethylene diffraction grating which is light in weight, flexible and has chemical resistance.

It is still another object of the invention to provide a method of producing polyethylene diffraction grating which allows ready variation of the grating constant thereof.

It is yet still another object of the invention to provide a method of continuously producing a polyethylene diffraction grating in a polyethylene film of large width.

In general, when fused polyethylene is allowed to cool, small size spherulites are formed each of which looks like an agglomerate of lamellar crystals of the orthorhombic crystal system. Each of the spherulites is made up of twisted lamellar crystals extending in all directions from the spherulite nucleus disposed in its center. This radial direction along which a lamellar crystal extends is its $b$-axis, and the $a$-axis and $c$-axis rotate spirally about the $b$-axis while being maintained at right angles to one another. It will thus be noted that the positions in which the lamellar crystals of the $c$-axis are oriented in a given direction are arranged on the $b$-axis at regular intervals in an orderly repetitive pattern.

As aforementioned, the arrangement of the lamellar crystals in an orderly repetitive pattern of refractive index occurs radially from the center of the spherulite in the conventional polyethylene film, but the polyethylene film according to the present invention has a construction such that the crystals are arranged parallel to the travelling direction and therefore the repetitive pattern of refractive index is arranged normal to the direction of the crystals and parallel to each other throughout the length of the film.

Figure 2:
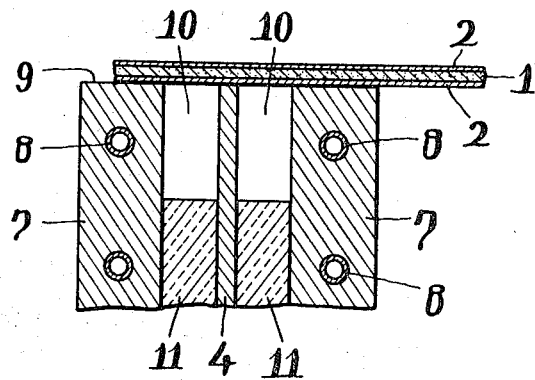

With these and other objects in view which will become apparent in the following detailed description, a method of producing a polyethylene diffraction grating embodying the present invention will be clearly understood in connection with the accompanying drawings, in which:

FIG. 1 is a perspective view of an apparatus for producing a polyethylene diffraction grating according to the present invention; and FIG. 2 is a sectional view of a modification of an apparatus for producing a polyethylene diffraction grating according to the present invention.

Referring now to the drawings, and more particularly to FIG. 1, a heating means 4 is heated to a predetermined temperature by a heating member 5 disposed therein and a cooling means 7 is provided with pipes 8 for passing cooling water therethrough to maintain a predetermined temperature, the heating means 4 and the cooling means 7 are disposed in side by side relation. A spacer 11 having a height smaller than the height of the heating means 4 and the cooling means 7 is mounted between the two means so as to leave a small space zone 10 between the upper portions of the heating and cooling means. A polyethylene film 1 held between supporting films 2 which are held by supporting frame 3 is moved from the heating zone 6 of the heating means 4 to the cooling zone 9 of the cooling means 7 by a motor (not shown) at a constant velocity while the underlying supporting film is maintained in close contact with the heating and cooling zones.

As polyethylene film 1 is subjected to the aforementioned treatment, the polyethylene film is firstly fused on heating zone 6 and then crystallized on cooling zone 9.

The heating means and the cooling means may be made of any material that has good thermal conductivity. Copper is the most suitable. The heating zone 6 over the heating means has a width ranging from 0.1 mm. to 5 mm. and the polyethylene film is heated to a temperature ranging from 140° C. to 300° C. The cooling zone 9 over the cooling means has a width ranging from 2 mm. to 5 mm. and the polyethylene film is cooled to temperatures ranging from 0° C. to 100° C. It is to be understood, however, that the aforementioned temperatures, the widths of heating and cooling zones and the rate of travel of the polyethylene film are related to one another. That is, the grating constant of the polyethylene diffraction grating can be effectively adjusted between 1 and 10 microns by adjustment of the rate of travel of the polyethylene film on the heating and cooling zones. When the rate of travel of the polyethylene film is increased a polyethylene diffraction grating of low grating constant can be obtained. The following table shows the relation between the rate of travel of the polyethylene film and the grating constant of the polyethylene diffraction grating produced.

| Rate of travel mm./min): | Grating constant (microns) |
|---|---|
| 0.25 | 3.9 |
| 0.125 | 4.8 |
| 0.083 | 5.6 |

The space zone 10 is preferably small in width in order to subject the polyethylene film to a sudden change in temperature. However, if the space is too small in width, there is a disadvantage in that efficiency of operation is reduced because the heating means 4 and the cooling means 7 are too closely positioned. Optimum values for the space zone 10 ranges from 0.2 mm. to 2 mm.

As the melted polyethylene film cannot alone be moved across the heating zone to the cooling zone, it is necessary to use supporting films to keep the polyethylene film in the fused state. The arrangement in which the heating means and the cooling means are disposed in close proximity to each other results in the polyethylene film or its supporting films becoming wavy because of thermal expansion, with the result that some areas of the polyethylene film are prevented from coming into contact with the heating zone and/or the cooling zone. This causes uneven development of crystals in the polyethylene film. In order to eliminate this problem, the supporting film used are preferably resilient to a certain degree. The material used for the supporting films must also be thin, tough, heat resistant, suitably adiabatic, smooth of surface, transparent, capable of being brought into close contact with polyethylene film, and inactive enough at its surface so as not to promote the development of spherulite nuclei. The materials that fulfill the aforementioned conditions required of the supporting films include, for example, cellophane, polyimide film and the like.

Preferably, the pressure in the space zone 10 between the heating means and cooling means is suitably reduced to ensure that the polyethylene film held between the supporting films may be moved through the heating zone and the cooling zone while the underlying supporting film is kept in full contact with the heating zone and cooling zone.

Superb products can be obtained by adjusting the temperature in the heating zone while carrying out microscopic observations during operation so that the crystallization line forming the boundary between fused polyethylene and crystallized solid polyethylene may be aligned and indexed with the center line in the space between the heating zone and the cooling zone.

The apparatus shown in FIG. 2 for putting the method of the present invention into practice includes two cooling means 7 arranged on opposite sides of the heating means 4 with space zone 10 being disposed therebetween.

Thus, the apparatus has one heating zone and two discrete cooling zones. When the apparatus shown in FIG. 2 is employed, the polyethylene film is cooled beforehand in the first cooling zone and its temperature is increased when it is moved to the narrow heating zone. In order to avoid disintegration of the polyethylene film, it is necessary to limit to a short period the time that the polyethylene film is subjected to high temperature. Depending on the material used better results may be achieved with this apparatus.

Several embodiments of the invention will now be described, however, it is understood that the invention is not limited to these embodiments.

EXAMPLE 1

The apparatus used includes a heating zone of about 3 mm. in width which is heated to about 280° C., a cooling zone the temperature of which is held to about 80° C., and a space of about 0.2 mm. disposed between the heating zone and the cooling zone. A polyethylene film of high density held between two taut cellophane films is moved over the heating zone to the cooling zone at a rate of 2 mm. per minute while the underlying cellophane film is kept in close contact with the heating zone and the cooling zone. A polyethylene diffraction grating with a grating constant of 1.5 micron is obtained.

EXAMPLE 2

When a polyethylene film of medium density held between two taut cellophane films is moved over the apparatus of Example 1 at a rate of 0.5 mm. per minute, a polyethylene diffraction grating with a grating constant of 3 microns is obtained.

EXAMPLE 3

When a polyethylene film of high density held between two taut polyimide films is moved over the apparatus of Example 1 at a rate of 0.11 mm. per minute, a polyethylene diffraction grating with a grating constant of 7.5 microns is obtained.

EXAMPLE 4

When a polyethylene film of high density held between two taut cellophane films is moved over an apparatus as shown in FIG. 2 comprising a heating zone of about 0.1 mm. in width heated to about 300° C. and two cooling zones of about 3 mm. in width cooled to about 80° C. which cooling zones are disposed on opposite sides of said heating zone 0.2 mm. therefrom, a polyethylene diffraction grating with a grating constant of 5 microns is obtained.

What is claimed is:
1. A method of manufacturing a polyethylene diffraction grating, comprising the steps of
   supporting a polyethylene film between two supporting films, the latter selected from the group consisting of cellophane films and polyimide films,
   passing said polyethylene film and said two supporting films at a constant velocity of from about 0.083–2 mm./min. over and amintaining same in close contact with a heating zone for heating same of a width of from 0.1 mm. to 5 mm. to cause fusing of said polyethylene film, a space zone for subjecting same to a sudden change in temperature and having a width of from 0.2 mm. to 2 mm., and a cooling zone for cooling same of a width greater than 2 mm. to cause crystallization of said polyethylene film, in sequence respectively, and
   maintaining said heating zone and said cooling zone at predetermined heating and cooling temperatures, respectively.

2. The method, as set forth in claim 1, wherein said polyethylene film has a high density.

3. The method, as set forth in claim 1, wherein
   said polyethylene film is heated to a temperature between about 140° C. and 300° C. in said heating zone, and
   said polyethylene film is cooled to a temperature between about 0° C. and 100° C. in said cooling zone.

4. A polyethylene diffraction grating manufactured by the steps of
   supporting a polyethylene film between two supporting films, the latter selected from the group consisting of cellophane films and polyimide films,
   passing said polyethylene film and said two supporting films at a constant velocity of from about 0.083–2 mm./min. over and maintaining same in close contact with a heating zone for heating same of a width of from 0.1 mm. to 5 mm. to cause fusing of said polyethylene film, a space zone for subjecting same to a sudden change in temperature and having a width of from 0.2 mm. to 2 mm., and a cooling zone for cooling same of a width greater than 2 mm. to cause crystallization of said polyethylene film, respectively, and maintaining said heating zone and said cooling zone at predetermined heating and cooling temperatures, respectively.

5. The method, as set forth in claim 1, wherein said polyethylene film has a medium density.

6. The method, as set forth in claim 1, further comprising the step of removing said supporting films after they have passed through said cooling zone.

7. The grating, as set forth in claim 4, manufactured by the further step of removing said supporting films after they have passed through said cooling zone.

References Cited
UNITED STATES PATENTS

| | | | |
|---|---|---|---|
| 2,791,801 | 5/1957 | Szantay | 264—327 |
| 3,006,800 | 10/1961 | Lasker et al. | 156—311 |
| 3,077,428 | 2/1963 | Heuser et al. | 156—311 |
| 3,163,104 | 12/1964 | Lapham | 156—311 |

JULIUS FROME, Primary Examiner

A. H. KOECKERT, Assistant Examiner

U.S. Cl. X.R.

156—81; 161—1, 142; 264—1, 108, 346